US010293644B2

(12) United States Patent
Seto et al.

(10) Patent No.: US 10,293,644 B2
(45) Date of Patent: May 21, 2019

(54) PNEUMATIC TIRE

(75) Inventors: Hideki Seto, Hiratsuka (JP); Yuichi Hara, Hiratsuka (JP); Hirokazu Shibata, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 886 days.

(21) Appl. No.: 13/996,813

(22) PCT Filed: Sep. 15, 2011

(86) PCT No.: PCT/JP2011/071122
§ 371 (c)(1),
(2), (4) Date: Jun. 21, 2013

(87) PCT Pub. No.: WO2012/086276
PCT Pub. Date: Jun. 28, 2012

(65) Prior Publication Data
US 2013/0269850 A1    Oct. 17, 2013

(30) Foreign Application Priority Data

Dec. 22, 2010  (JP) ................................ 2010-285468
Jul. 5, 2011  (JP) ................................ 2011-149036

(51) Int. Cl.
*B60C 5/14*    (2006.01)
*B60C 19/00*    (2006.01)
(Continued)

(52) U.S. Cl.
CPC ............ *B60C 19/00* (2013.01); *B29D 30/305* (2013.01); *B29D 30/3007* (2013.01);
(Continued)

(58) Field of Classification Search
CPC ........ B29D 30/0681; B29D 2030/0682; B60C 5/14; B60C 2005/145; B60C 2005/147
See application file for complete search history.

(56) References Cited

U.S. PATENT DOCUMENTS 2,754,887 A * 7/1956 Wykoff ............. B29D 30/0681
152/548
3,736,972 A * 6/1973 Petraschek ............. B29D 30/20
152/510
(Continued)

FOREIGN PATENT DOCUMENTS

JP    11-5261    *    1/1999    ............. B29D 30/30
JP    2009-990 A    1/2009
(Continued)

OTHER PUBLICATIONS

Machine generated English language translation of JP 11-5261 (original document dated Jan. 1999).*
(Continued)

*Primary Examiner* — Robert C Dye
*Assistant Examiner* — Cedrick S Williams
(74) *Attorney, Agent, or Firm* — Global IP Counselors, LLP (57) ABSTRACT

A pneumatic tire includes an inner liner layer formed from a laminate sheet obtained by laminating: a sheet made from a thermoplastic resin or a thermoplastic resin composition which is a blend of the thermoplastic resin and an elastomer; and a rubber bonded by curing to the thermoplastic resin or the thermoplastic resin composition. The pneumatic tire avoids occurrence of cracks near a splice portion of the inner liner layer after the pneumatic tire starts to be used for driving, and thereby achieves excellent durability. In the tire, an inner liner layer is formed by lap-splicing end portions of a laminate sheet which is obtained by the laminating A sheet with end portions each having a tip subjected to a tip sharpening process is used as the sheet made from the thermoplastic resin or the thermoplastic resin composition which is the blend of the thermoplastic resin and the elastomer.

6 Claims, 6 Drawing Sheets

(51) Int. Cl.
*B60C 1/00* (2006.01)
*B29D 30/30* (2006.01)
*B29D 30/06* (2006.01)

(52) U.S. Cl.
CPC .............. *B60C 1/0008* (2013.01); *B60C 5/14* (2013.01); *B29D 2030/0682* (2013.01); *B60C 2005/147* (2013.01); *Y10T 152/10495* (2015.01)

(56) References Cited

U.S. PATENT DOCUMENTS

| | | | | |
|---|---|---|---|---|
| 4,820,563 | A * | 4/1989 | Rausch | B60C 15/04 152/540 |
| 2003/0043954 | A1* | 3/2003 | Mori | G21C 3/3206 376/310 |
| 2006/0027309 | A1* | 2/2006 | Hayashi | B29D 30/3028 156/130 |
| 2008/0202167 | A1* | 8/2008 | Cavallaro | B23K 26/0736 65/104 |
| 2009/0131592 | A1* | 5/2009 | Sakai | B32B 25/08 525/190 |
| 2010/0193098 | A1* | 8/2010 | Kirino | C08L 23/22 152/450 |

FOREIGN PATENT DOCUMENTS

| | | | |
|---|---|---|---|
| JP | 2009-83776 A | 4/2009 | |
| JP | 2009-190448 A | 8/2009 | |
| JP | 2009-241855 | * 10/2009 | .............. B60C 5/14 |
| JP | 2009-241855 A | 10/2009 | |
| JP | 2010-5986 A | 1/2010 | |
| JP | 2010-167829 A | 8/2010 | |
| WO | 2008-029779 A1 | 3/2008 | |

OTHER PUBLICATIONS

Machine generated English language translation of JP 2009-241855 (original document dated Oct. 2009).*
Bonded lap joints of composite laminates with tapered edges International Journal of Solids and Structures Oterkus et al, Sep. 2005.*
Recent Advances in Structural Joints and Repairs for Composite Materials Chapter 2, pp. 27-66 Tong et al, 2003.*
International Search Report of corresponding International Application No. PCT/JP2011/071122, dated Dec. 20, 2011.

* cited by examiner

PNEUMATIC TIRE

CROSS-REFERENCE TO RELATED APPLICATIONS

This U.S. National stage application claims priority under 35 U.S.C. § 119(a) to Japanese Patent Application No. 2010-285468, filed in Japan on Dec. 22, 2010 and Japanese Patent Application No. 2011-149036, filed in Japan on Jul. 5, 2011, the entire contents of Japanese Patent Application Nos. 2010-285468 and 2011-149036 are hereby incorporated herein by reference.

BACKGROUND

Field of the Invention

The present invention relates to a pneumatic tire.

More specifically, the present invention relates to a pneumatic tire including an inner liner layer formed as follows. A laminate sheet is obtained by laminating: a sheet made from a thermoplastic resin or a thermoplastic resin composition which is a blend of the thermoplastic resin and an elastomer; and a rubber to be bonded by curing to the thermoplastic resin or the thermoplastic resin composition. The laminate sheet is cut to a predetermined length. End portions of the laminate sheet are spliced together. The resultant product is cured and molded into the inner liner sheet. This pneumatic tire does not develop cracks around a splice portion of the spliced laminate sheet (inner liner layer) after the pneumatic tire starts to be used for driving, and accordingly has excellent durability.

Background Information

In recent years, proposals and studies have been made to use a sheet-shaped object, formed from a thermoplastic resin or a thermoplastic resin composition which is a blend of the thermoplastic resin and an elastomer, as an inner liner of a pneumatic tire Japanese patent application Kokai publication No. 2009-241855.

For actual use of the sheet-shaped object formed from the thermoplastic resin or the thermoplastic resin composition which is the blend of the thermoplastic resin and the elastomer as the inner liner for the pneumatic tire, the following manufacturing method is generally employed. A laminate sheet is formed which includes: a sheet made from a thermoplastic resin or a thermoplastic resin composition which is a blend of the thermoplastic resin and an elastomer; and a rubber (tie rubber) sheet to be bonded by curing to the thermoplastic resin or the thermoplastic resin which is the blend of the thermoplastic resin and the elastomer. The laminate sheet is wound around a tire building drum, and is subjected to lap-splicing. The resultant product is subsequently subjected to a curing and molding process.

However, there is a case where a tire is manufactured by: pulling out a predetermined length of the laminate sheet including the thermoplastic resin or the thermoplastic resin composition which is the blend of the thermoplastic resin and the elastomer and the tie rubber layer, which has been wound into a rolled shape, from its roll and cutting out the laminate sheet; winding the laminate sheet around the tire building drum; lap-splicing the laminate sheet on the drum; and further curing and molding the resultant product. In this case, the components constituting the inner liner, namely, the sheet made from the thermoplastic resin or the thermoplastic resin composition, and the tie rubber sheet bonded by curing to the sheet made from the thermoplastic resin or the plastic resin composition, may be detached from each other after the tire starts to be used for driving.

This situation will be explained with drawings. As shown in FIG. 2(a), a laminate sheet 1 including: a sheet 2 made from a thermoplastic resin or a thermoplastic resin composition which is a blend of the thermoplastic resin and an elastomer; and a tie rubber layer 3, is cut to a desired size (length) with an edged tool, for example. Then, on a tire building drum, two end portions of the laminate sheet 1 are spliced together, with a lap splice portion S defined at the two ends thereof, into a way that the laminate sheet 1 is formed into an annular shape. Incidentally, when one laminate sheet 1 is used, the laminate sheet 1 is formed into an annular shape by splicing its two end portions together. When multiple laminate sheets 1 are used, the laminate sheets 1 are formed into an annular shape by splicing their end portions to one another.

Thereafter, other parts (not illustrated) needed for manufacturing the tire are wound, and then a curing and molding process is performed with a bladder. After the curing and molding process, as shown in a model diagram of FIG. 2(b), an inner liner layer 10 is formed which includes: the sheet 2 made from the thermoplastic resin or the thermoplastic resin composition which is the blend of the thermoplastic resin and the elastomer; and the tie rubber layer 3. In the vicinity of the splice portion S, there are formed a portion where the sheet 2 made from the thermoplastic resin or the thermoplastic resin composition is exposed, and a portion where the sheet 2 is buried in the tie rubber layer.

The above-mentioned phenomenon of detachment between the sheet 2, which is made from the thermoplastic resin or the thermoplastic resin composition, and the tie rubber sheet 3 bonded by curing thereto occurs particularly in the vicinity 4 shown in FIG. 2(b), for example, of the exposed tip portion of the sheet 2 made from the thermoplastic resin composition . Here, a crack occurs in the beginning, and then develops into the sheet detachment phenomenon.

SUMMARY

With the above-mentioned points taken into consideration, an object of the present invention is to provide a pneumatic tire formed as follows. A laminate sheet is formed by laminating: a sheet made from a thermoplastic resin or a thermoplastic resin composition which is a blend of the thermoplastic resin and an elastomer; and a rubber to be bonded by curing to the thermoplastic resin or the thermoplastic resin composition. A strip of the laminate sheet is obtained by cutting the laminate sheet to a predetermined length. Alternatively, the sheet made from the thermoplastic resin or the thermoplastic resin composition which is the blend of the thermoplastic resin and the elastomer, and the rubber to be bonded by curing to the thermoplastic resin or the thermoplastic resin composition are cut to the predetermined length, respectively. A strip of the laminate sheet is obtained by laminating the thus-cut pieces of the sheet and the rubber. End portions of the strip of the laminate sheet are lap-spliced together, and the resultant product is subjected to a curing and molding process. Thereby, the pneumatic tire is built to include an inner liner layer formed from the laminate sheet. After the thus-provided pneumatic tire starts to be used for driving, no cracks occur in the vicinity of a splice portion of the spliced laminate sheet (inner liner layer). Accordingly, the pneumatic tire has excellent durability.

To attain the object, a pneumatic tire according to the present invention includes the following configuration of section (1).

(1) A pneumatic tire including an inner liner layer 10 which is formed by lap-splicing end portions of a laminate sheet 1 obtained by laminating a sheet 2 and a rubber 3, the sheet 2 made from a thermoplastic resin or a thermoplastic resin composition which is a blend of the thermoplastic resin and an elastomer, and the rubber 3 to be bonded by curing to the thermoplastic resin or the thermoplastic resin composition, characterized in that a sheet with end portions each having a tip subjected to a tip sharpening process is used as the sheet 2 made from the thermoplastic resin or the thermoplastic resin composition which is the blend of the thermoplastic resin and the elastomer.

The pneumatic tire of the present invention preferably includes any one of the following configurations of sections (2) to (7).

(2) The pneumatic tire of section (1), characterized in that the tip sharpening process is carried out in a way that, in a location inward by a length of (t×⅓) from the tip of the sheet 2 made from the thermoplastic resin or the thermoplastic resin composition which is the blend of the thermoplastic resin and the elastomer, a thickness T (μm) has a relationship which satisfies 0.1t≤T≤0.8t.

Here, t represents an average thickness (μm), in a tire circumferential direction, of a tip-sharpening-unprocessed part of the sheet 2 made from the thermoplastic resin or the thermoplastic resin composition which is the blend of the thermoplastic resin and the elastomer, and T represents the thickness (μm) of the sheet 2 in the location inward by the length (t×⅓) from the tip of the sheet 2 made from the thermoplastic resin or the thermoplastic resin composition which is the blend of the thermoplastic resin and the elastomer.

(3) The pneumatic tire of section (1) or (2), ,characterized in that the tip-sharpening-processed part extends in a length L to a location inward, the length L expressed by L=(1.0 to 20)×t (μm).

(4) The pneumatic tire of any one of sections (1) to (3), characterized in that the tip-sharpening-processed part extends in a length L to a location inward from the tip, the length L expressed by L=(1.0 to 2.5)×t (μm).

(5) The pneumatic tire of any one of sections (1) to (4), characterized in that the pneumatic tire is formed through curing and molding, and the tip sharpening process is carried out before the curing and molding.

(6) The pneumatic tire of any one of sections (1) to (5), characterized in that the sheet 2 is made from the thermoplastic resin composition which is the blend of the thermoplastic resin and the elastomer, and on a surface of the tip-sharpening-processed tip, the elastomer is covered with a film of the thermoplastic resin.

(7) The pneumatic tire of any one of sections (1) to (6), characterized in that one or a plurality of the laminate sheets 1 are used, and the inner liner layer 10 is formed by lap-splicing two end portions of the one laminate sheet 1, or by lap-splicing corresponding end portions of the plurality of laminate sheets 1 to one another.

The present invention provides the pneumatic tire having excellent durability in which the components constituting the inner liner layer, namely, the sheet made from the thermoplastic resin or the thermoplastic resin composition, and the tie rubber sheet bonded by curing to the sheet made from thermoplastic resin or the thermoplastic resin composition, are prevented from detachment from each other after the tire starts to be used for driving.

The pneumatic tire can obtain the effects more reliably and more effectively at the same time.

Also, when the inner liner layer 10 is formed by: using the one or multiple laminate sheets; lap-splicing the end portions (the two end portions of the one laminate sheet, or the end portions of the multiple laminate sheets) to one another; and forming the one or multiple laminate sheets into an annular shape.

DETAILED DESCRIPTION OF EMBODIMENTS

Further detailed description will be hereinbelow provided for a method of manufacturing a pneumatic tire of the present invention.

The pneumatic tire of the present invention is a pneumatic tire whose inner liner layer 10 is formed by lap-splicing end portions of a laminate sheet 1 obtained by laminating: a sheet 2 made from a thermoplastic resin or a thermoplastic resin composition which is a blend of a thermoplastic resin and an elastomer; and a rubber 3 to be bonded by curing to the thermoplastic resin or the thermoplastic resin composition. The pneumatic tire is characterized in that, one whose tips are subjected to a tip sharpening process is used as the sheet 2 made from the thermoplastic resin or the thermoplastic resin composition which is the blend of the thermoplastic resin and the elastomer.

The inventors have examined causes of a problem with pneumatic tires produced by a conventional method from various aspects. The problem is that the components constituting the inner liner layer, namely, the sheet made from the thermoplastic resin or the thermoplastic resin composition which is the blend of the thermoplastic resin and the elastomer, and the tie rubber sheet bonded by curing to the sheet made from the thermoplastic resin or the thermoplastic resin composition. As a result of the examinations, the inventors have obtained the following findings.

One may consider that: in a case where the laminate sheet 1 is prepared by a usual method, large stress occurs in a rubber portion sandwiched between vertically-stacked end portions of the sheet 2 with large rigidity, made from the thermoplastic resin or the thermoplastic resin composition which is the blend of the thermoplastic resin and the elastomer, near a lap-splice portion S between the two ends of the laminate sheet 1 shown in FIGS. 2(a) and 2(b); and for this reason, the detachment takes place as cracks occur and become larger in the vicinity 4 and the like of the tip portions of the sheet 2 made from the thermoplastic resin or the thermoplastic resin composition.

Figure 1:
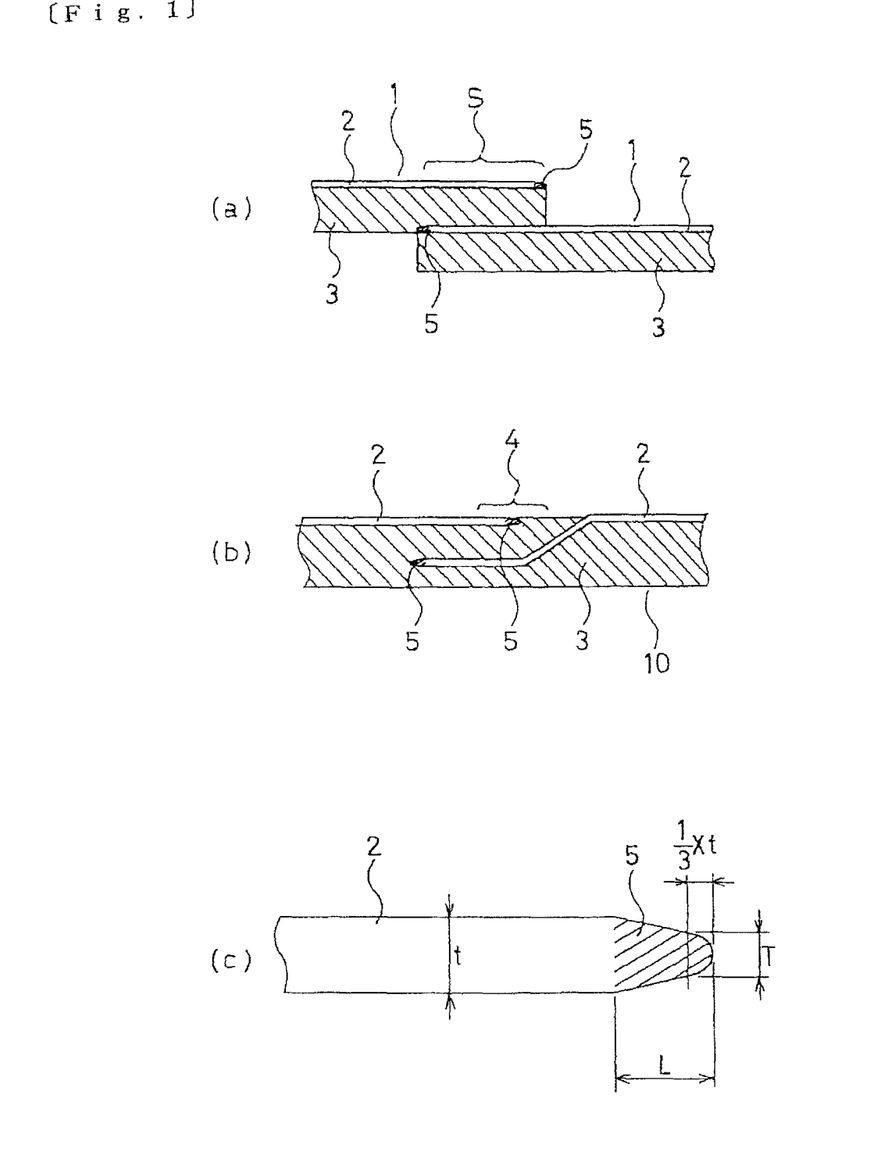
FIG. 1(a) is a model diagram showing a state where a laminate sheet 1 is wound around a tire building drum and two end portions of the laminate sheet 1 are lap-spliced to each other, in which the laminate sheet 1 is prepared by: laminating a sheet 2 made from a thermoplastic resin or a thermoplastic resin composition with tips subjected to a sharpening process, and a rubber 3 to be bonded by curing to the thermoplastic resin or the thermoplastic resin composition; and cutting the resultant product to a predetermined length.
FIG. 1(b) is a model diagram showing a state after the laminate sheet 1 in the state shown in FIG. 1(a) is subjected to a curing and molding process.
FIG. 1(c) is a schematic side view for explaining the sheet 2 made from the thermoplastic resin or the thermoplastic resin composition, whose tip is subjected to the sharpening process.

In contrast to this, in the pneumatic tire of the present invention, as shown in FIG. 1, one provided with parts 5 resulting from a tip sharpening process performed in the vicinity of each of its tips is prepared as the sheet 2 made from the thermoplastic resin or the thermoplastic resin composition which is the blend of the thermoplastic resin and the elastomer when the laminate sheet 1 is prepared by being cut to a predetermined length. This makes the thickness of each of the vertically-stacked end portions of the sheet 2 with the large rigidity, which is made from the thermoplastic resin or the thermoplastic resin composition being the blend of the thermoplastic resin and the elastomer, smaller in the vicinity 4 of each tip portion. In addition, since the area of an interface between the sheet 2 and the rubber portion 3 becomes larger, the stress is dispersed. For these reasons, the stress which occurs in the rubber portion 3 sandwiched between the end portions of the sheet 2 becomes smaller and dispersed, and is accordingly relaxed. After the tire starts to be used, this is effective in preventing the occurrence of a phenomenon of detachment between the sheet 2 made from the thermoplastic resin or the thermoplastic resin composition and the tie rubber sheet 3 bonded by curing to the sheet 2.

In a case where the laminate sheet 1 is only cut with a regular edged tool at normal temperature, a section of the laminate sheet 1 has a cut end surface which is perpendicular to the flat-surface direction of the sheet 2 when viewed in the widthwise direction of the sheet (FIG. 2(a)). In the present invention, however, the expression that the tip of the sheet 2 made from the thermoplastic resin or the thermoplastic resin composition which is the blend of the thermoplastic resin and the elastomer "is subjected to the tip sharpening process" means that, as shown in FIGS. 1(a) to 1(c) as models, the cut end surface of the sheet 2 of the present invention includes the tip-sharpening-processed part 5 which is tapered toward the tip as the result of the tip sharpening process. In other words, the expression means that, for the purpose of making the sheet 2 have such a lateral surface shape, the tip end of the sheet 2 is subjected to any of a physical treatment, a chemical treatment, a combination of the two treatments, a combination of the two treatments and a thermal treatment, and the like.

The process may be performed at the same time as when the laminate sheet 1 is cut to a predetermined length adapted to desired lap-splicing, or after the laminate sheet 1 is cut to the predetermined length. Alternatively, the tip sharpening process may be performed on the tip portion of the sheet 2 made from the thermoplastic resin or the thermoplastic resin composition, which is the blend of the thermoplastic resin and the elastomer, and/or a tip portion of the rubber 3 in a step before the laminate sheet is formed. Thereafter, the laminate sheet 1 may be formed by stacking and bonding the sheet 2 and the rubber 3.

No matter which type of the process is employed, the tip-sharpened shape can be realized in the tip portion of the laminate sheet, and the above-described effects of dispersing and relaxing the stress can be obtained. Meanwhile, the tip sharpening process may be performed after the tire is cured and molded. Particularly in a case where the tip sharpening process mainly includes a physical treatment as described later, performance of the tip sharpening process after the tire is cured and molded is advantageous from the viewpoint of ease and accuracy in performing the process.

With regard to the "shape which is tapered toward the tip as the result of the tip sharpening process," even a somewhat "rounded" shape is acceptable. The effect of preventing the occurrence of cracks and the occurrence of the detachment is observed significantly even when the tip portion thereof is only formed into such a somewhat rounded shape. The form resulting from subjecting the tip of the sheet 2 to the tip sharpening process is designed to practically keep the sharpened form before and after curing. Hence, the effect of preventing the occurrence of cracks and the occurrence of the detachment is effectively exerted after the tire starts to be used.

As described above, the tip sharpening process performed on the tip of the sheet 2 exerts its effect even when the tip is only formed into the somewhat rounded shape. Nevertheless, especially in order to stably obtain a higher effect, it is desirable that the tip sharpening process be carried out at a location inward by a length (t×⅓) from the tip of the sheet 2 made from the thermoplastic resin or the thermoplastic resin composition which is the blend of the thermoplastic resin and the elastomer, and with a thickness T (μm) in a way that the thickness T has a relationship satisfying 0.1t≤T≤0.8t. FIG. 1(c) shows this relationship, which specifies the level of the thickness at the location inward by the length (t/3) from the tip, where the thickness T preferably satisfies 0.2t≤T≤0.6t. In this respect, t represents an average thickness (μm) of a tip-sharpening-unprocessed part, in the tire circumferential direction, of the sheet 2 made from the thermoplastic resin or the thermoplastic resin composition which is the blend of the thermoplastic resin and the elastomer; and T represents the thickness (μm) of the sheet 2 at the location inward by the length (t×⅓) from the tip of the sheet 2 made from the thermoplastic resin or the thermoplastic resin composition which is the blend of the thermoplastic resin and the elastomer.

In addition, it is desirable that the length L of the tip-sharpening-processed part (denoted by reference numeral 5 in FIG. 1(c)) satisfy L=(1.0 to 20)×t (μm), i.e., that the tip-sharpening-process part extend to the location inward by the length L from the tip. It is more desirable that the length L satisfy L=(1.0 to 10)×t (μm). It is even more desirable that the length L satisfy L=(1.0 to 2.5)×t (μm).

It is desirable that the shape of the tip-sharpening-processed part be evenly tapered in view of its side sectional shape as shown in FIGS. 1(a) to 1(c). Nevertheless, unevenly tapered shapes can also exert the effect, so that an asymmetrically tapered shape, a shape which is sharpened like a taper and bent in one direction (for example, toward the tie rubber layer), a shape which has some recesses and projections, the above-mentioned somewhat rounded shape, and the like are applicable.

In the present invention, the tip-sharpening-process on the tip of the sheet 2 can be performed, for example, by pulling out the sheet 2 from a rolled form by a needed length, and thermally cutting the sheet 2 by applying a heat cutter, such as an electrically-heated wire, while adding tension to the sheet 2, or by cutting the sheet 2 with a regular edged tool and then either applying a chemical dissolution treatment to the cut end surface of the sheet in the longitudinal direction using an alkali, an acid and the like or applying a physical treatment to the cut end surface such as various grinding treatments using a grinder, a file and the like. Of these methods, the thermal cutting of the sheet 2 by applying a heat cutter with an obtuse-angled blade while adding tension to the sheet, or the like is desirable from the viewpoint of the controllability, facilities and costs.

It should be noted that in a case where the tip-sharpening process is performed by the thermal cutting, and particularly in a case where the sheet 2 is the one made from the thermoplastic resin composition which is the blend of the thermoplastic resin and the elastomer, the thermoplastic resin is cut while becoming flowable on the surface of the tip-sharpening-processed tip part due to the heat. For this reason, a phenomenon occurs in which the elastomer existing on the surface near the cut end is obtained while being covered with a film of the thermoplastic resin. A state of a stronger bond by curing can be obtained from the thus-obtained sheet 2 than from the sheet 2 bonded by curing with the elastomer being exposed. For this reason, the thus-obtained sheet 2 is effective in preventing the occurrence of cracks and the occurrence of the detachment. Generally speaking, when the elastomer is exposed on the cut surface of the laminate sheet, the elastomer hinders the bond by curing, and thus decreases the bonding strength by curing between the sheet made from the thermoplastic resin composition and the tie rubber sheet. For this reason, it is desirable that the tip be sharpened while minimizing the exposure of the elastomer. The above-mentioned thermal cutting method is desirable from this viewpoint.

When the thermal cutting method is employed, it is desirable that the thermal cutting be carried out in a condition to allow the thermoplastic resin melted and made flowable by the heat applied at the thermal cutting to fully cover the entire elastomer on the cut surface. To put it specifically, it is desired that the thermal cutting be carried out at a cutting temperature in a range of (the melting point of the thermoplastic resin+30° C.) to (the melting point of the thermoplastic resin+180° C.). If the cutting temperature is lower than this range, it is difficult to make the thermoplastic resin flowable, and is therefore difficult to cover the elastomer sufficiently. On the other hand, the cutting temperature higher than this range is undesirable because the thermoplastic resin composition and the tie rubber sheet may be deteriorated. It is desirable that the thermal cutting be carried out by use of the heat cutter, or by use of a laser. It is important to carry out the thermal cutting while adding heat and applying tension. Furthermore, the cutting may be carried out by applying the heat cutter while adding pressure. Meanwhile, an ultrasonic cutter, a high-frequency cutter and the like may be used similarly.

In addition, the effect of the "phenomenon in which the elastomer existing on the surface near the cut end is obtained while being covered with a film of the thermoplastic resin" by the thermal cutting can be also obtained by applying hot air, a heating plate or a heating roller to the end portion, which is cut out without using the heat, as appropriate after the cutting. Furthermore, when the tip sharpening process is performed on the sheet 2 alone, made from the thermoplastic resin or the thermoplastic resin composition which is the blend of the thermoplastic resin and the elastomer, in a step before the sheet 2 is formed into the laminate sheet, the above-described treatments can be performed on the sheet 2 alone.

FIG. 3(a) is a model diagram showing an example of a cutting method with which when the laminate sheet 1 is cut to a predetermined length adapted to desired lap-splicing, each tip of the sheet 2 made from the thermoplastic resin or the thermoplastic resin composition can be obtained in a state of being subjected to the sharpening process, in which the laminate sheet is formed by laminating the sheet 2 made from the thermoplastic resin or the thermoplastic resin composition, and the rubber 3 to be bonded by curing to the thermoplastic resin or the thermoplastic resin composition. FIG. 3(a) shows the example in which the laminate sheet 1 is thermally melted and cut by moving a heat cutter 8 in a direction indicated with an arrow D while inclining the heat cutter 8 at an inclination angle α to the longitudinal direction of the laminate sheet 1 (not inclining the heat cutter 8 in the widthwise direction of the laminate sheet). FIG. 3(b) shows, as a model, a relationship between the heat cutter 8 and the tip portion 9 of the sheet made from the thermoplastic resin or the thermoplastic resin composition 2 in the cutting method. In the tip of the laminate, the tip is sharpened in the cut end portion. It is desirable that the inclination angle α be set in a range of 30° to 60°.

FIG. 4(a) shows a cutting method which can be particularly preferably employed to thermally cut the sheet 2 made from the thermoplastic resin or the thermoplastic resin composition by use of the heat cutter. It is desirable to carryout the thermal cutting method by: applying the heat cutter 8 to a side surface of the sheet 2 made from the thermoplastic resin or the thermoplastic resin composition in a way that the heat cutter 8 intersects with the sheet 2 and extends to spaces above and under the sheet 2; and moving the heat cutter 8 from one end E1 to the opposite end E2 of the sheet 2 made from the thermoplastic resin or the thermoplastic resin composition while inclining the heat cutter 8 at an inclination angle θ to the direction D in which the heat cutter 8 is moved (in this case, in the same direction as the widthwise direction of the sheet 2 made from the thermoplastic resin or the thermoplastic resin composition.)

Figure 4:
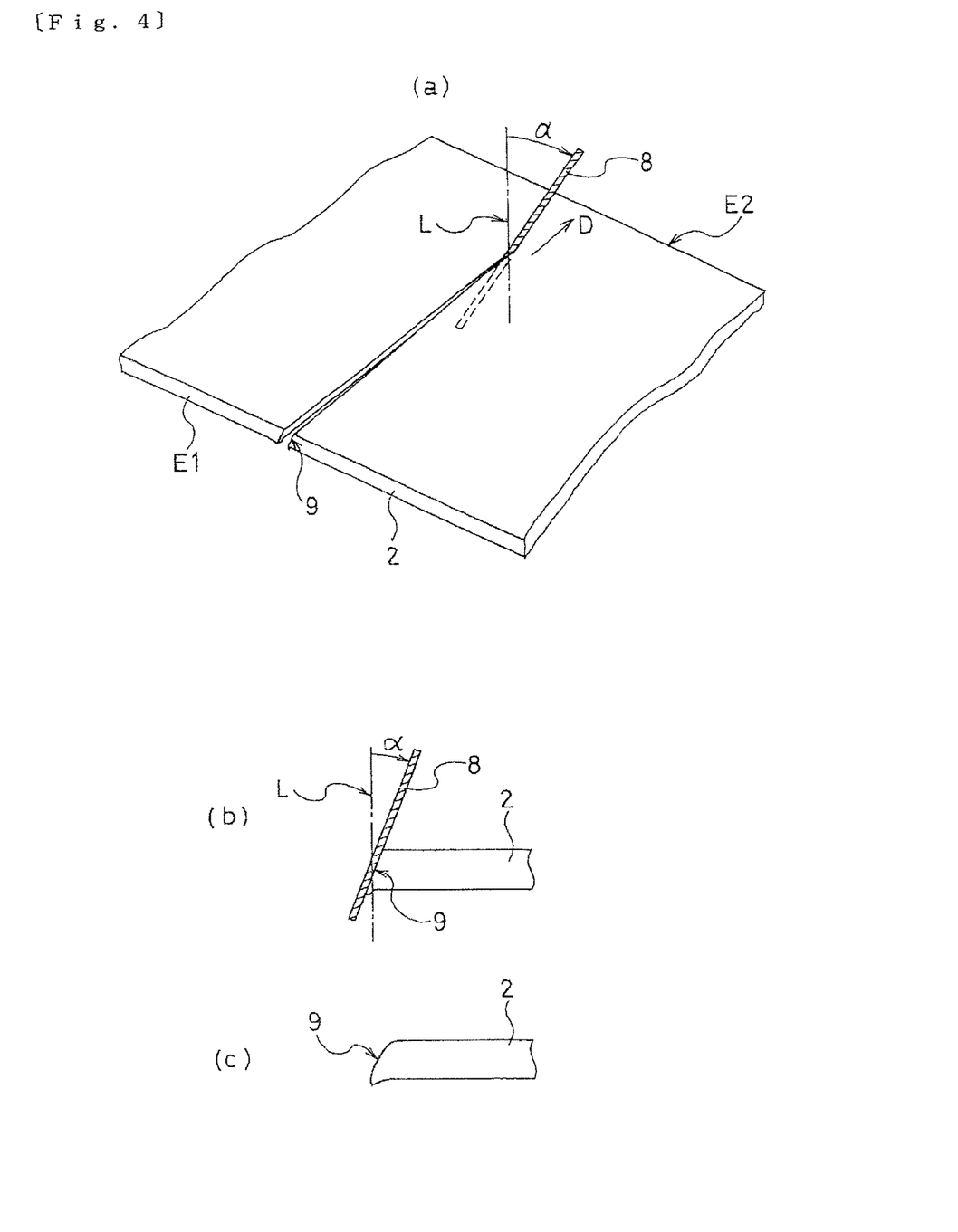
FIG. 4(a) is a model diagram showing an example of a cutting method in which, when the independent sheet 2 made from the thermoplastic resin or the thermoplastic resin composition is cut to the predetermined length adapted to desired lap-splicing, the tip of the sheet 2 made from the thermoplastic resin or the thermoplastic resin composition can be obtained in a state of being subjected to the sharpening process.
FIG. 4(b) shows, as a model, a relationship between a heat cutter 8 and the form of the tip portion 9 which can be obtained by the cutting method from the sheet 2 made from the thermoplastic resin or the thermoplastic resin composition.
FIG. 4(c) shows an example of the form of the tip portion 9 of the sheet which can be obtained by the cutting method from the sheet 2 made from the thermoplastic resin or the thermoplastic resin composition.

Based on the findings obtained by the inventors, it is desirable in the case of this method that the level as to how much the heat cutter 8 is inclined when the heat cutter 8 is moved conform to the state of inclination at the inclination angle α with respect to a direction perpendicular to the movement direction D (the cutting line direction) of the heat cutter 8. In this example, the inclination angle α is in a range of 10° to 60° to the perpendicular L to the sheet 2. The method of cutting the sheet 2 by moving the heat cutter 8 from the one end E1 side to the opposite end E2 side while making the heat cutter 8 intersect with the sheet in the above-mentioned manner is desirable from the viewpoint that the heat is less likely to dissipate and the cutting can securely produce a clear-cut surface, compared with a method of thermally cutting the sheet 2 made from the thermoplastic resin or the thermoplastic resin composition by applying the heat cutter 8 to the entire surface at once. The condition of the cut end obtained from this method is as shown in the model diagram of FIG. 4(*c*). The tip portion 9 of the sheet 2 made from the thermoplastic resin or the thermoplastic resin composition is subjected to the sharpening process, and the tip-sharpening-processed part 5 is accordingly formed. One may consider that this is resulted from the fact that the heat cutter 8 is moved while being inclined at the inclination angle α, whereby the sheet 2 made from the thermoplastic resin or the thermoplastic resin composition is cut while the tip portion 9 of the sheet 2 is melted and cut by receiving a downward pressing action.

Figure 5:
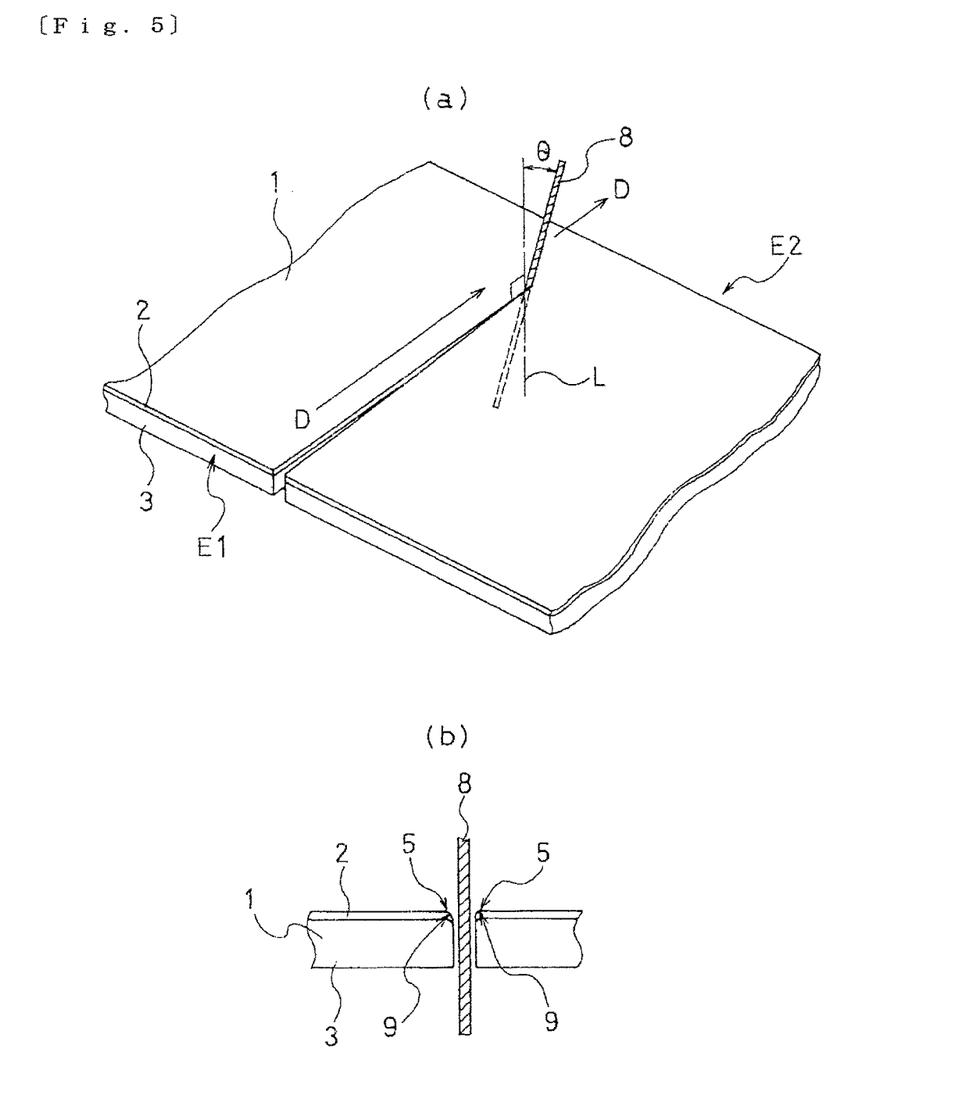
FIG. 5(a) is a model diagram showing another example of the cutting method in which, when the laminate sheet 1 formed by laminating the sheet 2 and the rubber 3 is cut to the predetermined length adapted to desired lap-splicing, the tip of the sheet 2 can be obtained in a state of being subjected to the sharpening process, in which: the sheet 2 is made from the thermoplastic resin or the thermoplastic resin composition; and the rubber 3 is to be bonded by curing to the thermoplastic resin or the thermoplastic resin composition.
FIG. 5(b) shows, as a model, a relationship with the form of the tip portion 9 which can be obtained by the cutting method from the sheet 2 made from the thermoplastic resin or the thermoplastic resin composition.

Furthermore, as shown in FIG. 5(*a*), the laminate sheet 1 formed by laminating the sheet 2 made from the thermoplastic resin or the thermoplastic resin component and the rubber 3 to be bonded by curing to the sheet may be cut by inclining the heat cutter 8 at the inclination angle (inclination angle in the direction which is the same as the movement direction D (cutting line direction) of the heat cutter 8) θ. Based on the findings obtained by the inventors, the condition of the cut end obtained by this method is as shown in the model diagram of FIG. 5(*b*). The tip portion of the sheet made of the thermoplastic resin composition 2 is sharpened and formed into the tip-sharpening-processed part 5. Usually, the part 5 is obtained as one which bends into the tip side of the sheet layer of the tie rubber 3. One may consider that this is resulted from the fact that the heat cutter 8 is moved while being inclined at the inclination angle θ, whereby the sheet made from the thermoplastic resin composition 2 is cut while the tip portion of the sheet is melted and cut by receiving the downward pressing action (toward the sheet layer of the tie rubber 3). According to the findings obtained by the inventors, even in a case of using the laminate in the form with the tip of the sheet of the thermoplastic resin composition 2 being slightly curved, an almost straight sharpened tip shape as shown in FIG. 1(*c*) can be eventually obtained once the tip portion is subjected to the curing and molding process, because the tip portion is pressed by a curing bladder during the process.

Figure 6:
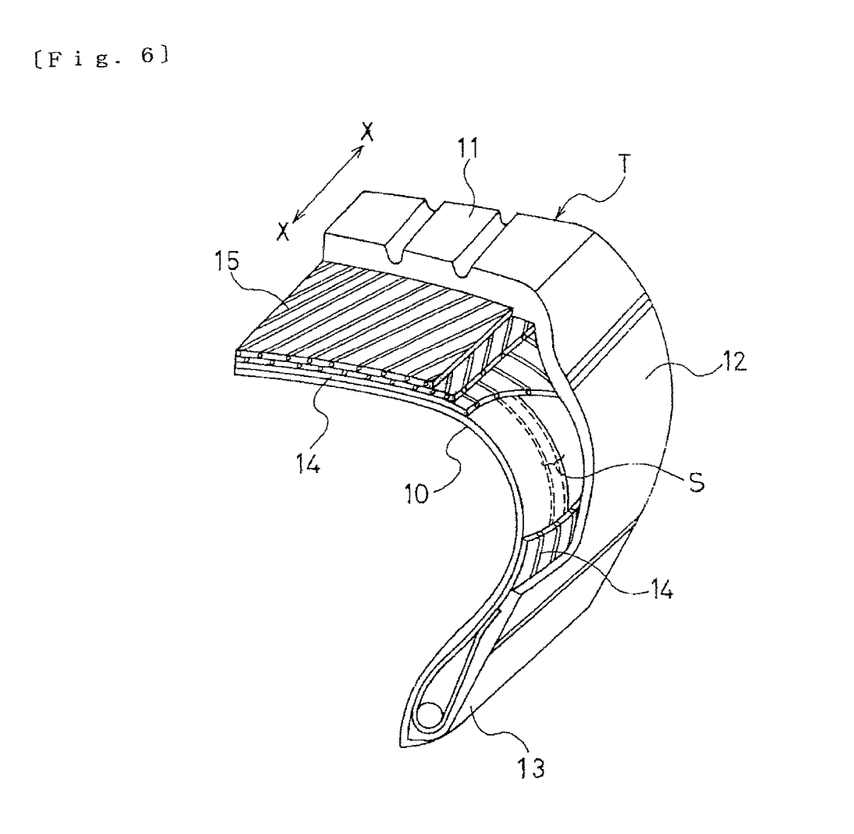
FIG. 6 is a partially-broken perspective view showing an example of a form of the pneumatic tire of the present invention.

FIG. 6 is a partially broken perspective view showing an example of the form of the pneumatic tire of the present invention. In the pneumatic tire T, a side wall portion 12 and a bead portion 13 are provided on each of the left and right of a tread portion 11 in a way that the side wall portion 12 and the bead portion 13 are connected together. In the inside of the tire, a carcass layer 14 which is a skeletal structure of the tire is provided in the tire widthwise direction in a way that the carcass layer 14 extends to the left and right beads 13, 13. Two belt layers 15 each made from steel cords are provided on an outer peripheral side of the carcass layer 14, which corresponds to the tread portion 11. Arrows X indicate the tire circumferential direction. The inner liner layer 10 is placed on the inside of the carcass layer 14. The lap-splice portion S of the inner liner layer 10 extends in the tire widthwise direction.

The pneumatic tire of the present invention inhibits: the occurrence of cracks which are more likely to take place near the lap-splice portion S on the inner peripheral surface of the conventional tire; the occurrence of cracks between the sheet 2 made from the thermoplastic resin or the thermoplastic resin composition and the tie rubber layer 3, from which the inner liner layer 10 is formed; and the occurrence of the detachment between the sheet 2 and the tie rubber layer 3. Accordingly, the durability of the pneumatic tire of the present invention is improved remarkably. While a lapping length of the lap-splice portion S depends on the size of the tire, the lapping length is preferably set to about 7 to 20 mm, and more preferably to about 8 to 15 mm. If the lapping length is too long, the uniformity tends to deteriorate. If the lap length is too short, the splice portion S is more likely to break during the molding process.

Examples of the thermoplastic resin preferably usable in the present invention include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 9T, nylon 6/6T copolymers, nylon 66/PP copolymers, and nylon 66/PPS copolymers]; their N-alkoxyalkylates, for example, methoxymethylated nylon 6, methoxymethylated nylon 6/610 copolymers, and methoxymethylated nylon 612; polyester-based resins [for example, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers]; polymethacrylate-based resins [for example, polymethylmethacrylate (PMMA) and polyethylmethacrylate]; polyvinyl-based resins [for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, and vinylidene chloride/acrylonitrile copolymers (ETFE)]; cellulose-based resins [for example, cellulose acetate and cellulose acetate butyrate]; fluororesins [for example, polyvinylidene fluoride (PVDF), polyvinyl fluoride (PVF), polychlorofluoroethylene (PCTFE), and tetrafluoroethylene/ethylene copolymers]; imide-based resins [for example, aromatic polyimide (PI)]; and the like.

Moreover, the above-mentioned matters may be used as the thermoplastic resin out of the thermoplastic resin and the elastomer collectively constituting the thermoplastic resin composition usable in the present invention. Examples of the elastomer usable in the present invention include: diene-based rubbers and their hydrogenated products [for example, natural rubbers (NR), isoprene rubber (IR), epoxidized natural rubbers, styrene-butadiene rubber (SBR), butadiene rubbers (BR, high-cis BR, and low-cis BR), nitrile rubber (NBR), hydrogenated NBR, and hydrogenated SBR]; olefin-based rubbers [for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers]; halogen-containing rubbers [for example, Br-IIR, Cl-IIR, brominated isobutylene-co-para-methylstyrene (BIMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for example, methyl vinyl silicone rubber, dimethyl silicone rubber, and methylphenylvinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers]; thermoplastic elastomers [for example, styrene-based elastomers, olefin-based elastomers, ester-based elastomers, urethane-based elastomers, and polyamide-based elastomers]; and the like.

At the time of blending a specific one of the above-mentioned thermoplastic resins and a specific one of the above-mentioned elastomers in combination, an appropriate compatibilizer may be used as a third component to make the thermoplastic resin and the elastomer compatible with each other if they are incompatible with each other. The interfacial tension between the thermoplastic resin and the elastomer decreases when such a compatibilizer is mixed in the blend system. As a result, the size of elastomer particles constituting a dispersion layer becomes finer. Accordingly, these two components exhibit their characteristics more effectively. In general, such a compatibilizer may have a copolymer structure including both or either of a structure of the thermoplastic resin and a structure of the elastomer, or a copolymer structure including an epoxy group, a carbonyl group, a halogen group, an amino group, an oxazoline group, or a hydroxyl group, which is capable of reacting with the thermoplastic resin or the elastomer. Such a compatibilizer may be selected depending on the types of the thermoplastic resin and the elastomer to be blended. Examples of the compatibilizer normally used include: styrene/ethylene-butylene block copolymers (SEBS) and their maleic acid-modified products; EPDM; EPM; EPDM/styrene or EPDM/acrylonitrile graft copolymers and their maleic acid-modified products; styrene/maleic acid copolymers; reactive phenoxine; and the like. The blending proportion of such a compatibilizer is not particularly limited, yet the blending proportion is preferably in a range of 0.5 to 10 parts by weight relative to 100 parts by weight of the polymer components (the total amount of the thermoplastic resin and the elastomer).

In the thermoplastic resin composition which is the blend of the thermoplastic resin and the elastomer, the composition ratio of the specific thermoplastic resin to the specific elastomer is not particularly limited. This composition ratio may be set as appropriate in order that the thermoplastic resin composition can have a structure in which the elastomer is dispersed as a discontinuous phase in the matrix of the thermoplastic resin. This composition ratio is preferably in a range of 90:10 to 30:70 by the weight ratio.

In the present invention, the thermoplastic resin or the thermoplastic resin composition which is the blend of the thermoplastic resin and the elastomer may be mixed with other polymers such as the compatibilizer, as long as the other polymers do not impair the characteristics needed for the inner liner. The purposes of mixing such other polymers are to improve the compatibility between the thermoplastic resin and the elastomer, to improve molding processability of the materials, to improve heat resistance, to reduce costs, and so on. Examples of materials used for such other polymers include polyethylene (PE), polypropylene (PP), polystyrene (PS), ABS, SBS, polycarbonate (PC), and the like. In addition, a filler (calcium carbonate, titanium oxide, alumina, or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the inner liner. The thermoplastic resin composition has the structure in which the elastomer is dispersed as the discontinuous phase in the matrix of the thermoplastic resin. Having such a structure, this thermoplastic resin composition can provide the inner liner both with sufficient flexibility and with sufficient rigidity based on the effect of the resin layer as the continuous phase. At the same time, when this thermoplastic resin composition is molded, the thermoplastic resin composition can achieve the molding processability equivalent to that of the thermoplastic resin regardless of the amount of the elastomer.

The Young's modulus of each of the thermoplastic resin and the elastomer usable in the present invention is not particularly limited, yet such a modulus is set preferably to 1 to 500 MPa or more preferably to 50 to 500 MPa.

EXAMPLES

Using examples and the like, specific descriptions will be hereinbelow provided for the pneumatic tire of the present invention.

It should be noted that each pneumatic tire was evaluated by comparing a condition of occurrence of cracks and a condition of the occurrence of detachment in the vicinity of the splice portion of the inner liner layer in the cavity of the test tire with those in other portions.

A tire with specifications of 215/70R15 98H was used as the test tire in each case. Two tires were prepared for each Example and Comparative Example. Each tire was mounted on a standard rim 15X6.5JJ specified in JATMA, and a tire inner pressure was set at a maximum pneumatic pressure (240 kPa) specified in JATMA.

Examples 1, 2 and Comparative Examples 1, 2

For each of Example 1 and Comparative Example 1, a sheet using N6/66 as the thermoplastic resin and having a thickness of 130 µm was used as the sheet made from the thermoplastic resin or the thermoplastic resin composition, which constituted the part of the inner liner layer.

Similarly, for Example 2 and Comparative Example 2, a sheet having a thickness of 130 µm and made from the thermoplastic resin composition which was obtained by blending N6/66 as the thermoplastic resin and BIMS as the elastomer at a 50:50 proportion as shown in Table 1 was used.

The single sheet of each of Examples 1, 2 was cut to the predetermined length using the heat cutter while tension of 1 to 3 N was added to the single sheet in a direction perpendicular to the heat cutter. The single sheet of each of Comparative Examples 1, 2 was prepared by cutting each of the above-described laminate sheets to the predetermined length using a blade-type cutter at room temperature while the blade-type cutter was applied to the sheet surface in a direction perpendicular to the sheet surface.

The cut end surface and its vicinity of the sheet of each of Examples 1, 2 and Comparative Examples 1, 2 were observed by use of an optical microscope. In Example 1, t, T and L were 130 μm, 30 μm and 120 μm, respectively. In Example 2, t, T and L were 130 μm, 40 μm and 100 μm, respectively.

In the sheet of each of Comparative Examples 1, 2, the tip was formed in a shape in which the cut end surface of the tip had an edge perpendicular to the flat-surface direction of the sheet.

On the other hand, for each of Examples 1, 2 and Comparative Examples 1, 2, a pneumatic tire in accordance with the above-mentioned specifications was produced by: laminating an adhesive tie rubber having a thickness of 0.7 mm and a composition as shown in Table 2, and the sheet of each of Examples 1, 2 and Comparative Examples 1, 2; lap-splicing the two end portions of the resultant laminate sheet together on the tire building drum with a lapping length of 10 mm; and employing a usual curing and molding method for the rest.

After running each pneumatic tire for 50,000 km at 7.35 kN, occurrence of cracks and detachment near the splice portion of the inner liner layer in the inner cavity of the test tire was examined while comparing with the condition of the rest of the test tire.

As a result, it was found that: in the sheet of each of Comparative Examples 1, 2, cracks occurred near the splice portion after running for 40,000 km; and the cracks developed into the detachment between the thermoplastic resin sheet and the tie rubber after running for 50,000 km cumulatively. At that time, no specific problem occurred in the area other than the vicinity of the splice portion and the condition in that area was satisfactory.

On the other hand, in the sheet of each of Examples 1, 2 of the present invention, no specific problem occurred either in the vicinity of the splice portion or in the other area even after running for 50,000 km.

Examples 3, 4

For Example 3, a sheet using N6/66 as the thermoplastic resin and having a thickness of 130 μm was used as the sheet made from the thermoplastic resin or the thermoplastic resin composition, which constituted the part of the inner liner layer.

For Example 4, a sheet having a thickness of 130 μm and made from the thermoplastic resin composition which was obtained by blending N6/66 as the thermoplastic resin and BIMS as the elastomer at a 50:50 proportion as shown in Table 1 was used.

Figure 3:
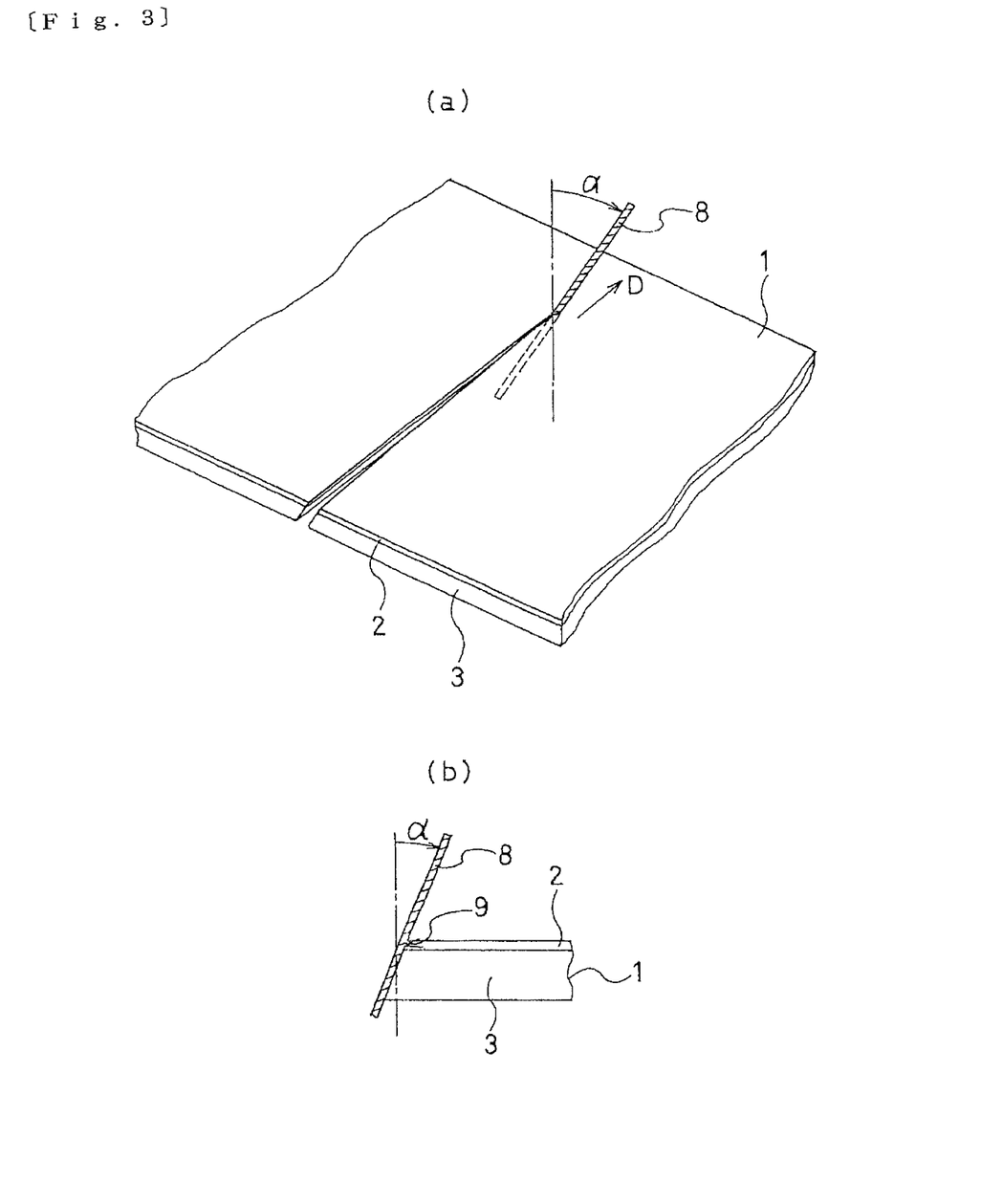
FIG. 3(a) is a model diagram showing an example of a cutting method with which when the laminate sheet 1 is cut to a predetermined length adapted to desired lap-splicing, each tip of the sheet 2 made from the thermoplastic resin or the thermoplastic resin composition can be obtained in a state of being subjected to the sharpening process, in which the laminate sheet is formed by laminating the sheet 2 made from the thermoplastic resin or the thermoplastic resin composition, and the rubber 3 to be bonded by curing to the thermoplastic resin or the thermoplastic resin composition.
FIG. 3(b) shows, as a model, a relationship between a heat cutter and a form of a tip portion 9 of the sheet 2 made from the thermoplastic resin or the thermoplastic resin composition in the cutting method.

As shown in FIG. 3, the single sheet of each of Examples 3, 4 was cut to the predetermined length while inclining the heat cutter only to the longitudinal direction of the sheet at the inclination angle α of 45 degrees.

The cut end surface and its vicinity of the sheet of each of Examples 3, 4 were observed by use of the optical microscope. In Example 3, t, T and L were 130 μm, 40 μm and 130 μm, respectively. In Example 4, t, T and L were 130 μm, 40 μm and 130 μm, respectively.

In the sheet of each of Comparative Examples 1, 2, the tip was formed in a shape in which the cut end surface of the tip had an edge perpendicular to the flat-surface direction of the sheet.

On the other hand, for each of Examples 3, 4, a pneumatic tire in accordance with the above-mentioned specifications was produced by: laminating an adhesive tie rubber having a thickness of 0.7 mm and the composition as shown in Table 2, and the sheet of each of Examples 3, 4; lap-splicing the two end portions of the resultant laminate sheet together on the tire building drum with a lapping length of 10 mm; and employing the usual curing and molding method for the rest.

After running each pneumatic tire for 50,000 km at 7.35 kN, occurrence of cracks and detachment near the splice portion of the inner liner layer in the inner cavity of the test tire was examined while comparing with the condition of the rest of the test tire.

As a result, it was found that: in the sheet of each of Examples 3, 4 of the present invention, no specific problem occurred either in the vicinity of the splice portion or in the other area even after running for 50,000 km as in the case of Examples 1, 2.

Examples 5, 6

For Example 5, a sheet using N6/66 as the thermoplastic resin and having a thickness of 130 μm was used as the sheet made from the thermoplastic resin or the thermoplastic resin composition, which constituted the part of the inner liner layer.

For Example 6, a sheet having a thickness of 130 μm and made from the thermoplastic resin composition which was obtained by blending N6/66 as the thermoplastic resin and BIMS as the elastomer at a 50:50 proportion as shown in Table 1 was used.

The single sheet of each of Examples 5, 6 was cut to the predetermined length in accordance with the method shown in FIG. 4 by moving the heat cutter 8, but while holding the heat cutter 8 in the vertical direction at the inclination angle α of 0 degrees and at the inclination angle θ of 0 degrees. The tip portion thus cut was in a state of not being sharpened.

The edge portion of each single sheet 2 thus cut was polished by applying an abrasive sheet to the edge portion while inclining the abrasive sheet only to the longitudinal direction of the single sheet at the inclination angle (inclination angle between the cutting line direction and the right-angle direction) α of 45 degrees, and the inclination angle (inclination angle in the same direction as the cutting line direction) θ of 0 degrees.

The cut end surface and its vicinity of the sheet of each of Examples 5, 6 were observed by use of the optical microscope. In Example 5, t, T and L were 130 μm, 20 μm and 400 μm, respectively. In Example 6, t, T and L were 130 μm, 20 μm and 400 μm, respectively.

On the other hand, for each of Examples 5, 6, a pneumatic tire in accordance with the above-mentioned specifications was produced by: laminating an adhesive tie rubber having a thickness of 0.7 mm and the composition as shown in Table 2, and each sheet of Example 5, 6; lap-splicing the two end portions of the resultant laminate sheet together on the tire building drum with a lapping length of 10 mm; and employing the usual curing and molding method for the rest.

After running each pneumatic tire for 50,000 km at 7.35 kN, occurrence of cracks and detachment near the splice portion of the inner liner layer in the inner cavity of the test tire was examined while comparing with the condition of the rest of the test tire.

As a result, it was found that: in the sheet of each of Examples 5, 6 of the present invention, no specific problem occurred either in the vicinity of the splice portion or in the other area even after running for 50,000 km as in the case of Examples 1, 2.

Examples 7, 8 and Comparative Examples 3, 4

For each of Example 7 and Comparative Example 3, a sheet using N6/66 as the thermoplastic resin and having a thickness of 130 μm was used as the sheet made from the thermoplastic resin or the thermoplastic resin composition, which constituted the part of the inner liner layer.

Similarly, for Example 8 and Comparative Example 4, a sheet having a thickness of 130 μm and made from the thermoplastic resin composition which was obtained by blending N6/66 as the thermoplastic resin and BIMS as the elastomer at a 50:50 proportion as shown in Table 1 was used.

Figure 2:
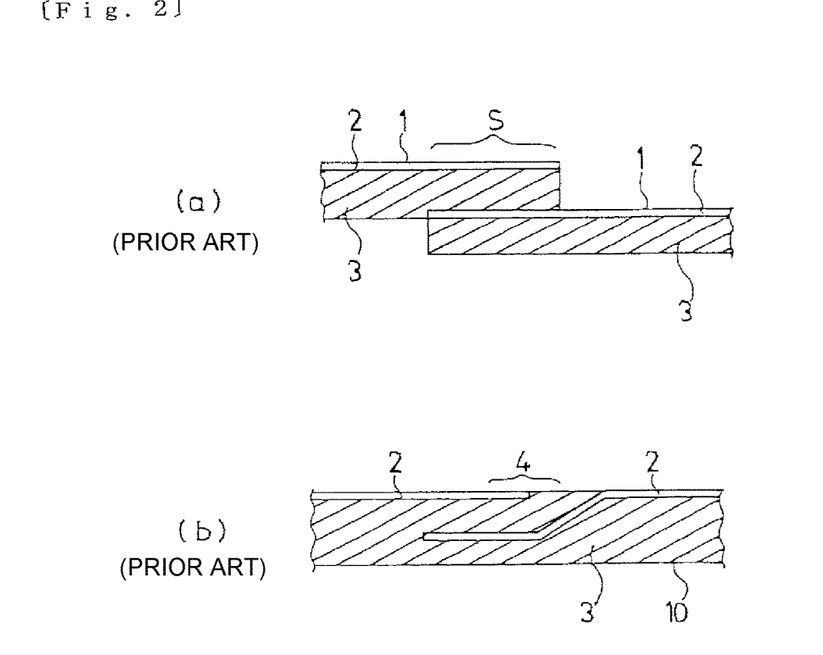
FIG. 2(a) is a model diagram showing a state where the laminate sheet 1 is cut to the predetermined length and wound around the tire building drum, and the two end portions of the laminate sheet 1 are lap-spliced to each other, in which the laminate sheet 1 is prepared by: laminating the sheet 2 made from the thermoplastic resin or the thermoplastic resin composition with the tips not subjected to the sharpening process, and the rubber 3 to be bonded by curing to the thermoplastic resin or the thermoplastic resin composition; and cutting the resultant product to the predetermined length.
FIG. 2(b) is a model diagram showing a state after the laminated sheet 1 in the state shown in FIG. 2(a) is subjected to the curing and molding process.

Similarly, a rubber having a thickness of 0.7 mm and the composition as shown in FIG. 2 was used as the adhesive tie rubber which constituted the other part of the inner liner layer. A laminate sheet obtained by laminating the sheet made from the thermoplastic resin or the thermoplastic resin composition and the tie rubber layer was prepared as a roll of the laminate sheet.

For each of Examples 7, 8, when the laminate sheet was wound around the tire building drum with the two ends of the laminate sheet lap-spliced together, the laminate sheet was cut to the predetermined length by a thermal cutting method (with a cutting temperature of 300° C.) in which the heat cutter (electrically-heated wire cutter (0.6 mm in diameter)) was applied to the laminate sheet while adding tension of 3 to 5 N. For each of Comparative Examples 3, 4, the laminate sheet was cut with the blade-type cutter at room temperature.

The cut end surface and its vicinity of the laminate sheet of each of Examples 7, 8 and Comparative Examples 3, 4 were observed by use of the optical microscope. In the laminate sheet of each of Examples 7, 8, the tip was sharpened since the laminate sheet was thermally cut with the tension added to the tip. In Example 7, t, T and L were 130 μm, 45 μm and 250 μm, respectively. In Example 8, t, T and L were 130 μm, 70 μm and 200 μm, respectively. Incidentally, an observation of the laminate sheet of Example 8 through an X-ray photoelectron spectroscopic analysis (XPS) confirmed that the BIMS as the elastomer existing on the cut end surface was almost completely covered with the N6/66 as the thermoplastic resin which was melted and made flowable.

In the laminate sheet of each of Comparative Examples 3, 4, the tip was formed in a shape in which the cut end surface of the tip had an edge vertical to the flat-surface direction of the sheet. In the laminate sheet of Comparative Example 4, the BIMS as the elastomer existing on the cut end surface was directly exposed to the outside.

A pneumatic tire in accordance with each of the above-mentioned specifications was produced by: lap-splicing the two end portions of the laminate sheet together on the tire building drum with a lapping length of 10 mm; and employing the usual curing and molding method for the rest.

After running each pneumatic tire for 50,000 km at 7.35 kN, occurrence of cracks and detachment near the splice portion of the inner liner layer in the inner cavity of the test tire was examined while comparing with the condition of the rest of the test tire.

As a result, it was found that: in the laminate sheet of Comparative Example 3, cracks occurred near the splice portion after running for 40,000 km; and the cracks developed into the detachment between the thermoplastic resin sheet and the tie rubber after running for 50,000 km cumulatively. At that time, no specific problem occurred in the area other than the vicinity of the splice portion and the condition in that area was satisfactory.

Meanwhile, in the laminate sheet of Comparative Example 4, cracks occurred near the splice portion after running for 20,000 km; and the cracks developed into the detachment between the thermoplastic resin composition sheet and the tie rubber after running for 50,000 km cumulatively. At that time, no specific problem occurred in the area other than the vicinity of the splice portion and the condition in that area was satisfactory.

On the other hand, as in the case of Examples 1, 2, the test was performed on the laminate sheet of each of Examples 7, 8. No specific problem occurred either in the vicinity of the splice portion or in the other area even after running for 50,000 km.

Examples 9, 10

For each of Examples 9, 10, the laminate sheet was thermally cut as in the case of Examples 7, 8, except that the heat cutter was used by setting the inclination angle (inclination angle in the same direction as the movement direction D of the heat cutter 8) θ to 20°.

In Example 9, t, T and L were 130 μm, 30 μm and 290 μm, respectively. In Example 10, t, T and L were 130 μm, 60 μm and 220 μm, respectively. Incidentally, an observation of the laminate sheet of Example 10 through the X-ray photoelectron spectroscopic analysis (XPS) confirmed that the BIMS as the elastomer existing on the cut end surface was almost completely covered with the N6/66 as the thermoplastic resin which was melted and made flowable. In each of Examples 9, 10, the laminate sheet had a shape in which, as shown in FIG. 3(b), the tip portion of the sheet of thermoplastic resin composition 2 slightly bent into the tie rubber layer side. However, after the tire was subjected to the curing and molding process, the tip portion had an almost straight sharpened tip shape as shown in FIG. 1(c) since the tip portion was pressed by the curing bladder during the process.

As in the case of Examples 1, 2, the tire of each of Examples 9, 10 was subjected to a running test. No problem occurred after running for 50,000 km.

TABLE 1

| | | parts by mass |
|---|---|---|
| BIMS [a] | "Exxpro 3035" manufactured by ExxonMobil Chemical | 100 |
| zinc oxide | "Zinc Oxide 3" manufactured by Seido Chemical Industry Co., Ltd. | 0.5 |
| stearic acid | industrial stearic acid | 0.2 |

TABLE 1-continued

| | | parts by mass |
|---|---|---|
| zinc stearate | "Zinc Stearate" manufactured by NOF Corporation | 1 |
| N6/66 | "UBE Nylon 5033B" manufactured by Ube Industries Ltd. | 100 |
| modified EEA [b] | "HPR-AR201" manufactured by Du Pont-Mitsui Polychemicals Co., Ltd. | 10 |

Remarks:
[a] brominated isobutylene-co-para-methylstyrene
[b] maleic anhydride-modified ethylene/ethyl acrylate copolymer

TABLE 2

| | | parts by mass |
|---|---|---|
| styrene-butadiene rubber | "Nipol 1502" manufactured by Zeon Corporation | 50 |
| natural rubber | SIR-20 | 50 |
| carbon black | "SEAST V" manufactured by Tokai Carbon Co., Ltd. | 60 |
| stearic acid | industrial stearic acid | 1 |
| aroma oil | "Desolex No. 3" manufactured by Showa Shell Sekiyu K.K. | 7 |
| zinc oxide | "Zinc Oxide 3" manufacatured by Seido Chemical Industry Co., Ltd. | 3 |
| modified resorcin formaldehyde condensate | "Sumikanol 620" manufactured by Taoka Chemical Co., Ltd. | 2 |
| methylene donor | modified etherified methylol-melamine "Sumikanol 507AP" manufactured by Taoka Chemical Co., Ltd. | 6 |
| sulfur | 5% oil-extended sulfur | 6 |
| vulcanization accelerator | di-2-benzothiazolyl disulfide "Nocceler-DM" manufactured by Ouchi Shinko Chemical Industrial Co., Ltd. | 2.2 |

The invention claimed is:

1. A pneumatic tire including
an inner liner layer which is lap-spliced and has a sheet made from a thermoplastic resin or a thermoplastic resin composition which is a blend of the thermoplastic resin and an elastomer, and a rubber, and the sheet including end portions, each of the end portions having a sharpened tip,
each of the sharpened tips of the sheet having a thickness T (μm) that has a relationship which satisfies $0.1t \leq T \leq 0.8t$, where
t represents an average thickness (μm), in a tire radial direction, of a tip-sharpening-unprocessed part of the sheet, and
T represents the thickness (μm) of the sheet in a location inward in a tire circumferential direction by a length (t×⅓) from an end of each of the sharpened tips of the sheet,
the inner liner layer having an overlapping portion in which the end portions of the sheet overlap each other throughout an entirety of the overlapping portion in the tire radial direction, the overlapping portion including a first surface and a second surface that oppositely face relative to each other, the first surface of the overlapping portion being formed by both the sheet and the rubber with the rubber overlapping one of the sharpened tips, one of the end portions, which forms the first surface of the overlapping portion, having the one of the sharpened tips, the second surface of the overlapping portion being formed solely by the rubber.

2. The pneumatic tire of claim 1, wherein
each of the sharpened tips of the sheet extends in a length L to a location inward from the end of each of the sharpened tips, with the length L being expressed by $L=(1.0 \text{ to } 20) \times t$ (μm).

3. The pneumatic tire of claim 1, wherein
each of the sharpened tips of the sheet extends in a length L to a location inward from the end of each of the sharpened tips, with the length L being expressed by $L=(1.0 \text{ to } 2.5) \times t$ (μm).

4. The pneumatic tire of claim 1, wherein
the sheet is made from the thermoplastic resin composition which is the blend of the thermoplastic resin and the elastomer, and
on a surface of each of the sharpened tips, the elastomer is covered with a film of the thermoplastic resin.

5. The pneumatic tire of claim 2, wherein
the sheet is made from the thermoplastic resin composition which is the blend of the thermoplastic resin and the elastomer, and
on a surface of each of the sharpened tips, the elastomer is covered with a film of the thermoplastic resin.

6. The pneumatic tire of claim 3, wherein
the sheet is made from the thermoplastic resin composition which is the blend of the thermoplastic resin and the elastomer, and
on a surface of each of the sharpened tips, the elastomer is covered with a film of the thermoplastic resin.

* * * * *